United States Patent [19]

Haller et al.

[11] Patent Number: 4,914,154
[45] Date of Patent: Apr. 3, 1990

[54] NOVEL MATTING AGENT AND ITS USE

[75] Inventors: Ingo Haller; Ernst Spindler; Manfred Heisler; Willi Kleine, all of Burghausen, Fed. Rep. of Germany

[73] Assignee: Wacker-Chemie GmbH, Fed. Rep. of Germany

[21] Appl. No.: 766,044

[22] Filed: Aug. 15, 1985

[30] Foreign Application Priority Data

Aug. 24, 1984 [DE] Fed. Rep. of Germany ....... 3431201
Jul. 3, 1985 [DE] Fed. Rep. of Germany ....... 3523788

[51] Int. Cl.$^4$ ..................... C08L 51/00; C08L 27/06; C08F 14/06
[52] U.S. Cl. ..................... 525/80; 524/515; 525/222; 525/239; 526/323.2; 526/344; 526/344.3
[58] Field of Search .................. 526/323.3, 344.3, 344; 525/80, 222, 239

[56] References Cited

U.S. PATENT DOCUMENTS

| 3,538,067 | 11/1970 | Bognar | 526/344.3 |
| 3,706,705 | 12/1972 | Koyanagi | 526/344.3 |
| 3,753,966 | 8/1973 | Koyanagi | 526/344.3 |
| 3,767,637 | 10/1973 | Egli | 526/344.3 |
| 3,956,251 | 5/1976 | Feiler | 526/344.3 |
| 4,058,495 | 11/1977 | Serratore | 526/344.3 |
| 4,206,298 | 6/1980 | Reichert | 526/344.3 |

FOREIGN PATENT DOCUMENTS

| 109504 | 6/1984 | Japan | 526/344.3 |
| 914407 | 1/1963 | United Kingdom | 526/344.3 |

Primary Examiner—Christopher Henderson
Attorney, Agent, or Firm—Bierman and Muserlian

[57] ABSTRACT

A matting agent for plastic compositions comprising either a high molecular weight, gel-containing vinyl chloride polymer with a gel content of 10 to 99% by weight, a maximum mercury porosity of 0.2 cm$^3$/g, a maximum plasticizer absorption of 15%, a particle size parameter d' of 10 to 80 μm and a coefficient of uniformity n greater than 3, or a high molecular weight, gel containing copolymer of vinyl chloride and 1 to 40% by weight of comonomer with a gel content of 10 to 99% by weight, a maximum mercury porosity of 0.10 cm$^3$/g, a maximum plasticizer absorption of 10%, a particle size parameter d' of 10 to 80 μm and a coefficient of uniformity n greater than 3, plastic articles containing said matting agent and a method of imparting a matt to the surface of plastic articles.

13 Claims, No Drawings

NOVEL MATTING AGENT AND ITS USE

STATE OF THE ART

Plastic articles generally have glossy surfaces which is in many cases undesirable and accordingly, there have been a whole series of publications concerned with finding a solution to this problem, especially with producing a surface for the most varied types of plastics articles that is matt and as uniform as possible. For example, processes have already been described for the production of matt films in which the calender run-out rollers are roughened and are supposed to give the film a matt appearance on one or both sides by embossing. Apart from the disadvantage that the surfaces of these tools, which are very expensive to obtain, often have to be after-treated as a result of wear, the matting obtained therewith can hardly be described as uniform, especially when the films are further treated at elevated temperatures, for example by deep drawing processes and the like. Even when used for other purposes, these films soon have glossy areas again as a result of abrasion. In addition, the apparatus is arranged for a certain type of film and any conversion of the calender for other films is very time-consuming and therefore expensive.

Consequently, various attempts have already been made to obtain uniform matting by altering the formulations and by using additives, for example precipitated silica or other inorganic matting agents. However, such additions of inorganic matting agents often involve a detrimental change in the physical properties of the shaped articles produced therefrom, and the processing properties of the molding compositions modified thereby are in many cases altered in an undersirable way, or even impaired. This may become evident, for example, through increased abrasion of the shaping tools or through the formation of coating scales, and in many cases through the drastically reduced thermostability of the mixture.

To avoid these difficulties, the solution that was often adapted consisted of adding high molecular weight polyvinyl chloride (PVC) or high molecular weight copolymers of vinyl chloride (VC) to the plastic compositions, especially to PVC compositions.

For example, DE-A No. 27 16 853 described a molding composition consisting of a mixture of two portions of vinyl chloride polymer having different average molecular weights and which, when subjected to a roll-kneading calendering process, results in films having a rough matt surface. Shaped articles produced from such molding compositions by extrusion do not, however, have the desired effect of silk-matt surfaces, but their surfaces are more or less glossy and rough. In so far as the molding compositions described in the application are based on polyvinyl chloride produced by emulsion polymerization, they are entirely unsuitable, for example, for extrusion to form hollow articles.

DE-A No. 25 20 229 discloses a process for the manufacture of shaped articles having a "frost and ice effect", according to which there is used, inter alia, a polyvinyl chloride that has a K value of 55 to 65, that is produced by the suspension polymerization method and that contains no or only a small amount of plasticizer. Mixed with this polyvinyl chloride is another suspension polyvinyl chloride having a K value of more than 65; the K values of the two polymers should differ by at least 10 units. The addition of chemical propellants and/or talcum is supposed to improve the desired effect. It was found that, without the last-mentioned additives, the appreciable matting effect can be achieved only by using sand-blasted molds to roughen the plastic surfaces.

According to CH-A No. 457 822, a mixture of polyvinyl chloride types which are in a ratio by weight of 30:70 to 70:30 and the K values of which differ by from 10 to 30 units is also supposed to achieve matting. Care has to be taken that, when processing on a vulcanizing machine known from the rubber industry, the relatively high molecular weight plastic is completely bound or gelled.

EP-A No. 104 433 describes a molding composition based on vinyl chloride polymers and the extrusion processing thereof which composition consists essentially of from 5 to 50% by weight of high molecular weight, optionally partially cross-linked vinyl chloride polymer that is manufactured by the suspension process and whose soluble portion has a K value of more than 90, and from 95 to 50% by weight of a vinyl chloride polymer having a K value of from 55 to 65. This composition is used for the manufacture of bottles and other hollow articles having a silk-matt surface.

It has also been found that, when processing polyvinyl chloride plastisols, a reduction in gloss sufficient to produce slight matting effects can be achieved, for example, by admixing relatively large amounts of high molecular weight types of polyvinyl chloride produced according to the microsuspension process with pastes based on polyvinyl chloride having low to medium average molecular weights. For example, Vinnol® P 90 E is suitable for this purpose (Vinnol is a registered trade mark of Wacker-Chemie GmbH, Munich). The matting effect is adequate for various applications but is not yet up to the required standard. In addition, a common feature of all the compositions and processes discussed above is that they are suitable for only one particular processing method, that is to say the plastisol process or the extrusion process or the calendering process, and in many cases give rough surfaces and/or unsatisfactory and/or non-uniform matting.

OBJECTS OF THE INVENTION

It is an object of the invention to provide a novel matting agent which avoids the above-mentioned disadvantages and provides the possibility of obtaining reproducible, uniform and pronounced matting with a defined roughness and without glossy areas by an addition polymer and largely independent of processing methods and of the recipes (for example the plasticiser content) without in practice impairing the mechanical properties, thermostability and chemical resistance.

It is another object of the invention to provide novel plastic articles with a matted surface containing the said matting agent and to a novel method of imparting a matted surface to a plastic article.

These and other objects and advantages of the invention will become obvious from the following detailed description.

THE INVENTION

The novel matting agent of the invention for plastic compositions is comprised of either a high molecular weight, gel-containing vinyl chloride polymer (1.) with a gel content of 10 to 99% by weight, a maximum mercury porosity of 0.2 cm³/g, a maximum plasticizer absorption of 15%, a particle size parameter d' of 10 to 80 μm and a coefficient of uniformity n greater than 3 (1.) or a high molecular weight, gel containing copolymer of vinyl chloride and 1 to 40% by weight of comonomer.

The said matting agent is especially suitable both for use in plastic compositions that are used in hard or soft processing, for example for the manufacture of films and other sheetlike articles, especially on a calender, and, for example, for the manufacture of extrudates as well as for use in plastisols in which the advantage of an improvement in the viscosity is also apparent.

The advantageous effect of the high molecular weight vinyl chloride polymer, especially the surprisingly good and uniform matting which can even be increased during further processing, for example by deep-drawing processes, and the unforeseeable possibility of being able to use the matting agent both in hard formulations and soft or even plastisol formulations, can be achieved even with an extremely small addition of from 1 to 50% by weight, based on the total weight of the polymers, that is to say the matting agent and the matrix polymer. In the case of thermoplastic processing for the manufacture of hard and soft products, preferably from 2 to 10% by weight are sufficient and in the case of plastisol processing, preferably from 10 to 50% by weight are sufficient.

The gel content of the matting agent which is the residue which is insoluble on extraction with boiling tetrahydrofuran in a Soxhlet apparatus over a period of 48 hours is from 10 to 99% by weight, preferably over 25% by weight, especially from 40 to 90% by weight. Relatively high gel contents, for example over 50% by weight, give better matting and relatively low gel contents produce at least a distinct reduction in gloss. The matting agent has a very uniform granulation, expressed as particle size parameter d' and coefficient of uniformity n according to the Rosin-Rammler equation (see DIN 66 141 or Vauck-Mueller, "Grundoperationen chemische Verfahrenstechnik", 5th edition, Dresden, 1962, page 234). The parameter d' is preferably from 10 to 80, especially from 30 to 70, μm, and the coefficient n is preferably greater than 4. It has been found that, because of the high gel content, the indication of a K value would serve no purpose in the characterization of the matting agent.

The maximum porosity of the vinyl chloride polymer matting agent, measured as mercury porosity at pressures of up to 300 bar, is preferably 0.15, especially 0.10 cm$^3$/g, and the maximum plasticizer absorption according to DIN 53 417 (German Industrial Standards) is 15%, preferably 10%. The vinyl chloride copolymers with other monomers preferably have a maximum mercury porosity of 0.15, more preferably 0.10 and especially 0.05, cm$^3$/g and a maximum plasticizer absorption of preferably 10%, more preferably 7%.

In the vinyl chloride copolymers, the amount of additional comonomer is 1 to 40% by weight, preferably 5 to 20% by weight, based on the total amount of monomer. Example of suitable comonomers are vinyl esters, preferably vinyl acetate and/or vinyl propionate; methacrylic and acrylic acid esters, preferably butyl acrylate and/or methyl methacrylate; maleic acid esters; fumaric acid esters and similar copolymerizable monomers without other functional groups which are able to cross-link the polymers.

The matting agent can be used together with customary vinyl chloride polymers that are manufactured by the suspension, emulsion, microsuspension or block polymerization process and which are here referred to as the matrix polymer. Depending on the processing method, the matrix polymer preferably has a K value of from 50 to 85. Often it is even possible to use matrix polymers having K values of up to 100. It should be noted, however, that when using matrix polymers having relatively high K values, better matting is achieved the greater the gel content in the matting agent. Matrix polymers having K values of preferably from 50 to 80, especially less than 70, can be used especially advantageously in hard processing and those having K values of preferably from 60 to 85, especially from 65 to 80, are especially suitable for soft processing and paste processing. Polymers having the higher K values mentioned can also be used for the latter purpose.

Since formulations for the hard, soft and plastisol processing of vinyl chloride polymers are generally known, it is unnecessary to repeat them here. The few formulations that may be unsuitable will be recognized as such and excluded by the person skilled in the art at the latest after carrying out a few preliminary tests. It should merely be mentioned that the customary additives can of course also be used concomitantly according to the invention, especially plasticizers, for example based on dicarboxylic acid esters and phosphoric acid esters, light and heat stabilizers, for example based on Zn, Cd, Ba, Pb and Sn, processing auxiliaries, for example lubricants based, for example, on acrylates, impact-resistance modifiers, for example based on ethylene; vinyl acetate; acrylate or ethylene-vinyl acetate-vinyl chloride copolymers or graft copolymers and ABS and MBS (see DIN 7728). Pigments and/or fillers may also be included. A list of suitable additives can be found, for example, in EP-A No. 104 433. These additives can be used in the customary amounts.

The matting agent of the invention can of course also be used in conjuction with matting agents known hitherto, but also for example in conjunction with the mentioned Vinnol ® P 90 E which, when used alone, does not produce any real matting but, in reality, only reduces gloss.

The high molecular weight vinyl chloride polymer used in the invention as a matting agent can be manufactured by the block (mass) or suspension polymerization process by copolymerizing vinyl chloride with cross-linking agents such as diallyl phthalate or maleate, triallyl isocyanurate, diallyl ether, divinyl compounds, or di- and tri-acrylates or methacrylates of polyhydric alcohols. The amount of cross-linking agent is chosen by one skilled in the art so that the desired gel content of the polymer is obtained. The desired particle morphology can be achieved in accordance with the processes of British Patent No. 1164008; U.S. Pat. No. 3,813,373; and EP-A No. 28,812. According to the second embodiment of the invention the high molecular vinyl chloride polymer can be manufactured as above with the modification, that additional monomers copolymerizable with vinyl chloride are concomitantly used, said monomers being selected from the group consisting of vinyl esters, preferably vinyl acetate and/or vinyl propionate, esters of (met)acrylic acids such as preferably butyl acrylate and/or methyl metharcylate, esters of maleic and fumaric acids and similar copolymerizable compounds having no additional functional groups and mixtures thereof.

Even with as low a content of matting agent as 1 to 50% by weight, especially in the case of thermoplastic processing from 2 to 10% by weight and in the case of plastisol processing from 10 to 50% by weight, based on the total polymer content, the plastic compositions of the invention exhibit good to very good matting, which can even be increased, for example by stretching, with a very uniform surface structure which corresponds, for example, to that which can be obtained with freshly sand-blasted calender rollers.

Even when subjected to shearing and relatively high processing temperatures, the matting agent of the invention does not disintegrate into its primary particles as do the hitherto customary plastic based matting agents which are manufactured by emulsion, microsuspension and, in some cases, also by suspension polymerization, and the matting agent of the invention thus ensures matting even in hard polyvinyl chloride products. If primary particles are formed as a result of the disintegration of the secondary structure of a matting agent then, because of the fineness, it is possible to obtain only a reduction in gloss and not a uniformly matt surface.

Although high molecular weight suspension polyvinyl chloride having a customary particle structure has a matting action, the effect that can be obtained depends to a very great extent on the processing method and the formulation, for example the plasticizer content. If the secondary structures are retained, this results in a very rough or non-uniform surface and in a distinct deterioration in the mechanical properties, for example a reduction in the elongation at tear and in the tear propagation resistance. In the case of a relatively high degree of shearing and relatively high processing temperatures, the secondary structures disintegrate to an increasing extent in these conventional S-polyvinyl chloride products too whereby, again, the surface becomes very non-uniform or even smooth. Even the cross-linking of such S-polyvinyl chloride products only partially eliminates these disadvantages.

In contrast, the matting agents of the invention and the plastic compositions manufactured therewith give reproducibly uniform surface matting with a uniform defined roughness when using the most varied processing methods and conditions, in the case of hard, soft and paste processing, without any appreciable impairment of the mechanical properties, thermostability and chemical resistance. In the case of paste processing, an advantageous reduction in viscosity is also brought about.

The plastic compositions of the invention are based on a vinyl chloride polymer for the manufacture of shaped articles, sheet-like articles, coverings or coatings having a silk-matt surface which composition comprises a matrix polymer, from 1 to 50% by weight of a matting agent according to the present invention, based on the total weight of the polymers used, of a high molecular weight vinyl chloride polymer and, optionally, other additives.

In the following examples there are described several preferred embodiments to illustrate the invention. However, it is to be understood that the invention is not intended to be limited to the specific embodiments. The K values were determined by DIN 53,726.

In the examples, the suitability of matting agents of the invention and not of the invention for various methods of processing polyvinyl chloride compositions was investigated. The matting agents were included in the following basic formulations: in the zero formulation without a matting agent, 100 parts by weight of the matrix polymer or of the mixture of the matrix polymers were used in each case.

Hard processing

1. Basic formulation for film calendering 95 parts by weight of Vinnol ® Y 60 MS (mass Polyvinyl chloride having a K value of 60, Wacker-Chemie GmbH Munich)

5 parts by weight of matting agent 1.3 parts by weight of sulfur-tin stabilizer 0.5 parts by weight of glycerine monooleate 0.3 parts by weight of montanic acid ester wax 2 parts by weight of titanium dioxide pigment Pre-plasticizing variant I batch-wise with roll mill, 5 minutes at 165° C.

variant II continuously with single-screw extruder, temperature of composition on discharge from die 175° C.

Film manufacture on L-shaped 4-roll calender, film draw-off ratio 1:1.15 and 1:2.5

2. Basic formulation for sheet die film-extrusion 50 parts by weight of Vinnol ® E 60 RN (emulsion polyvinyl chloride having a K value of 60, Wacker-Chemie GmbH, Munich) and 45 parts by weight of Vinnol ® H 10/60 (suspension PVCA having a K value of 60, 10% of vinyl acetate content, Wacker-Chemie GmbH, Munich)

5 parts by weight of matting agent 2.2 parts by weight of Ca-Zn stabilizer 5 parts by weight of epoxidized soya bean oil 0.5 parts by weight of commercially available combination lubricant, 0.2 part by weight of polyethylene wax 3 parts by weight of titanium dioxide pigment and yellow pigment 3. Basic formulation for bottle blowing 95 parts by weight of Vinnol ® Y 57 M (mass polyvinyl chloride having a K value of 57, Wacker-Chemie GmbH, Munich)

5 parts by weight of matting agent 1.2 parts by weight of sulfur-tin stabilizer 8 parts by weight of MBS impact resistance modifier 0.8 parts by weight of combination lubricant 0.1 part by weight of polyethylene wax 4. Basic formulation for impact-resistant hard profiles (for example for window profiles)

50 parts by weight of Vinnol ® K 510/68 (graft polymer of chloride on ethylene-vinyl acetate copolymer, Wacker-Chemie GmbH, Munich),K value 68)

45 parts by weight of Vinnol ® H 65 D (S polyvinyl chloride having a K value of 65, Wacker-Chemie GmbH, Munich)

5 parts by weight of matting agent 2.5 parts by weight of Ba-Cd stabilizer 0.5 part by weight of phosphite chelator 3 parts by weight of pigments+fillers 0.8 part by weight of lubricant 5. Basic formulation for thermoplastic soft processing (calender, extrusion, blowing extrusion)

90 parts by weight of Vinnol ® H 70 DF (S-polyvinyl chloride having a K value of 70, with a particularly high plasticizer-absorption)

10 parts by weight of matting agent 40 parts by weight of dioctyl phthalate (DOP, diethylhexyl phthalate), 2 parts by weight of Ba-Cd-Zn stabilizer, processing aids analogous to basic formulation 1

6. Basic formulation for paste processing (surface coat for floor coverings)

40 parts by weight of Vinnol® E 79 CS (emulsion polyvinyl chloride having a K value of 79, Wacker-Chemie GmbH, Munich)
25 parts by weight of Vinnol® P 70 (microsuspension polyvinyl chloride having a K value of 70, Wacker-Chemie GmbH, Munich)
35 parts by weight of matting agent
35 parts by weight of benzylbutyl phthalate (BBP)
7 parts by weight of dodecylbenzene
1 part by weight of tin stabilizer There were used as matting agents or as comparison substances:

(a) polyvinyl chloride having a gel content of from 83 to 84%, manufactured according to DE-OS No. 1,645,668 with the addition of 0.4% by weight triallyl isocyanurate (TAC, % based on vinyl chloride)
(b) polyvinyl chloride having a gel content of approximately 53%, manufactured as (a), but with 0.2% by weight TAC
(c) polyvinyl chloride having a K value of 100, soluble in cyclohexanone, manufactured by the microsuspension process
(d) polyvinyl chloride having a K value of from 78 to 79, manufactured by the emulsion process (Vinnol® E 78 G, Wacker-Chemie GmbH, Munich)
(e) polyvinyl chloride manufactured analogously to (a) but without TAC additive
(f) S-polyvinyl chloride manufactured by a formulation for K value 70 with the addition of 0.4% TAC, with a gel content of from 75 to 80%
(g) commercially available precipitated silica
(h) commercially available matting agent based on acrylate
(i) S-polyvinyl chloride having a K value of 100, still soluble.

The results of the tests are given in the following Table. In the Table:
− = no matting
0 = reduction in gloss
+ = uniform matting
x = irregular specked surface In the following tables examples according to this invention are numbered and comparison tests are indicated by upper case letters.

| Example Comparison test | Matting agent or comparison agent | Processing of rigid articles | | | | |
|---|---|---|---|---|---|---|
| | | calender process | | | Bottle-film blowing | Profile extrusion |
| | | Variant I | Variant II | Extruded | | |
| 1 | a | + | + | + | + | + |
| 2 | b | 0 | + | + | + | + |
| 3 | a + 5 Parts by wgt. Vinnol(R) P 90 E | + | + | | | |
| A | none | − | − | − | − | − |
| B | c | 0 | 0 | | | |
| C | d | − | − | 0 | | |
| F | e | − | − | | − | |
| E | f | x | x | | | |
| F | g | x | x | | | |
| G | h | 0 | + | | | |
| H | i | 0 | | x | x | x |

| Example Comparison test | Processing of soft articles | | | | |
|---|---|---|---|---|---|
| | calender films | | Blown films | Extruded articles | Pastes |
| | Variant I | Variant II | | | |
| 1 | + | + | + | + | + |
| 2 | 0 | + | + | + | + |
| 3 | | | | | |
| A | − | − | − | − | − |
| B | 0 | | | 0 | 0 |
| C | − | − | | | |
| D | | | | | |
| E | | | | | |
| F | | | | | |
| G | x | x | x | x | x |
| H | x | x | x | x | x |

Examples 1 to 3 were repeated using as the matting agent (A) a copolymer of 86% by weight of vinyl chloride and 14% by weight of vinyl acetate with a gel content of 56 to 57% produced by DE-OS No. 1,645,668 containing 0.5% by weight of TAC based on the copolymer and (B) a copolymer of 85% by weight of vinyl chloride and 15% by weight of vinyl acetate with a gel content of 66 to 67% produced by DE-OS No. 1,645,668 containing 0.3% by weight of TAC. The results were the same as in Examples 1 to 3 except that in Example 2 using the (B) copolymer, variations I of both hard and soft processing also showed uniform matting.

Various modifications of the matting agent and the plastic compositions and the method may be made without departing from the spirit or scope thereof and it should be understood that the invention is intended to be limited only as defined in the appended claims.

What we claim is:

1. A matting agent for plastic compositions which is a high molecular weight, gel-containing vinyl chloride polymer with a gel content of 10 to 99% by weight, a maximum mercury porosity of 0.2 cm$^3$/g, a maximum plasticizer absorption of 15%, a particle size parameter d' of 10 to 80 μm and a coefficient of uniformity n greater than 3.

2. A matting agent of claim 1 wherein the gel content is above 25% by weight.

3. A matting agent of claim 1 wherein the gel content is 40 to 90% by weight.

4. A matting agent of claim 1 wherein the mercury porosity maximum is 0.15 cm$^3$/g.

5. A matting agent of claim 1 wherein the maximum mercury porosity is 0.10 cm$^3$/g.

6. A matting agent of claim 1 wherein the parameter d' is 30 to 70 μm.

7. A matting agent of claim 1 wherein the coefficient n is greater than 4.

8. A plastic composition based on a vinyl chloride polymer for production of shaped articles, sheet-like articles and coatings with a silk-matt surface comprising a vinyl chloride matrix polymer, optional customary additives and a matting agent of claim 2.

9. A composition of claim 8 wherein the matrix polymer has a K value of 50 to 80.

10. A composition of claim 8 wherein the matrix polymer has a K value of 60 to 85.

11. A method of imparting to articles made of a vinyl chloride matrix polymer a silk-matt surface comprising incorporating into the matrix polymer a sufficient amount of a matting agent of claim 2 to obtain silk-matt surface.

12. The method of claim 11 wherein the matrix polymer has a K value of 60 to 100 and is in the form of a plastisol.

13. The method of claim 12 wherein the amount of matting agent is 10 to 50% by weight based on the total polymer.

* * * * *